(12) United States Patent
Muraji

(10) Patent No.: US 8,915,537 B2
(45) Date of Patent: Dec. 23, 2014

(54) VEHICLE BODY STRUCTURE

(75) Inventor: Masao Muraji, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/497,396

(22) PCT Filed: Oct. 21, 2009

(86) PCT No.: PCT/JP2009/068130
§ 371 (c)(1),
(2), (4) Date: Mar. 21, 2012

(87) PCT Pub. No.: WO2011/048675
PCT Pub. Date: Apr. 28, 2011

(65) Prior Publication Data
US 2012/0212007 A1    Aug. 23, 2012

(51) Int. Cl.
*B62D 21/15* (2006.01)
*B60R 19/02* (2006.01)
(52) U.S. Cl.
CPC ............ *B62D 21/152* (2013.01); *B60R 19/02* (2013.01); *B60R 2019/026* (2013.01)
USPC ............... 296/187.11; 293/133; 296/187.03
(58) Field of Classification Search
CPC .................................................... B62D 21/155
USPC ............ 296/187.08, 187.11, 193.08, 203.04; 293/132, 133, 102
See application file for complete search history.

(56) References Cited

U.S. PATENT DOCUMENTS

| 3,915,486 | A | 10/1975 | Maeda et al. |
| 7,681,700 | B2 * | 3/2010 | Ginja et al. ................... 188/377 |
| 7,699,346 | B2 * | 4/2010 | Wehner et al. ................ 280/784 |
| 2009/0026802 | A1 * | 1/2009 | Imada et al. ............. 296/187.11 |

FOREIGN PATENT DOCUMENTS

| JP | 49 128415 | 12/1974 |
| JP | 63 066699 | 12/1988 |
| JP | 2 296557 | 12/1990 |
| JP | 5 080917 | 11/1993 |

(Continued)

OTHER PUBLICATIONS

International Search Report issued on Nov. 17, 2009 in PCT/JP09/068130 filed on Oct. 21, 2009.

(Continued)

*Primary Examiner* — Glenn Dayoan
*Assistant Examiner* — Melissa A Black
(74) *Attorney, Agent, or Firm* — Oblon, Spivak, McClelland, Maier & Neustadt, L.L.P.

(57) ABSTRACT

There is provided a vehicle body structure that can improve collision performance at the time of a rear collision. The vehicle body structure includes first and second crash boxes that are provided at rear ends of rear side members. Further, the second crash boxes are disposed at positions different from the positions of the first crash boxes in a vertical direction of the vehicle. The second crash boxes, which are disposed at the positions different from the positions of the first crash boxes, can absorb a load applied from bumper reinforcement of another vehicle. Since a load at the time of a rear collision is absorbed by the second crash boxes, it is possible to suppress the deformation of a trunk that is provided at the rear portion of a vehicle body.

15 Claims, 5 Drawing Sheets

(56) References Cited

FOREIGN PATENT DOCUMENTS

| | | |
|---|---|---|
| JP | 11 255154 | 9/1999 |
| JP | 2002 145113 | 5/2002 |
| JP | 2005 162049 | 6/2005 |
| JP | 2006 205943 | 8/2006 |
| JP | 2006 273134 | 10/2006 |
| JP | 2008 132816 | 6/2008 |
| JP | 2010-202093 A | 9/2010 |

OTHER PUBLICATIONS

English Translation of the International Preliminary Report on Patentability issued May 24, 2012, in PCT/JP2009/068130 filed Oct. 21, 2009.

Extended European Search Report issued May 25, 2012, in Patent Application No. 09850573.8.

* cited by examiner

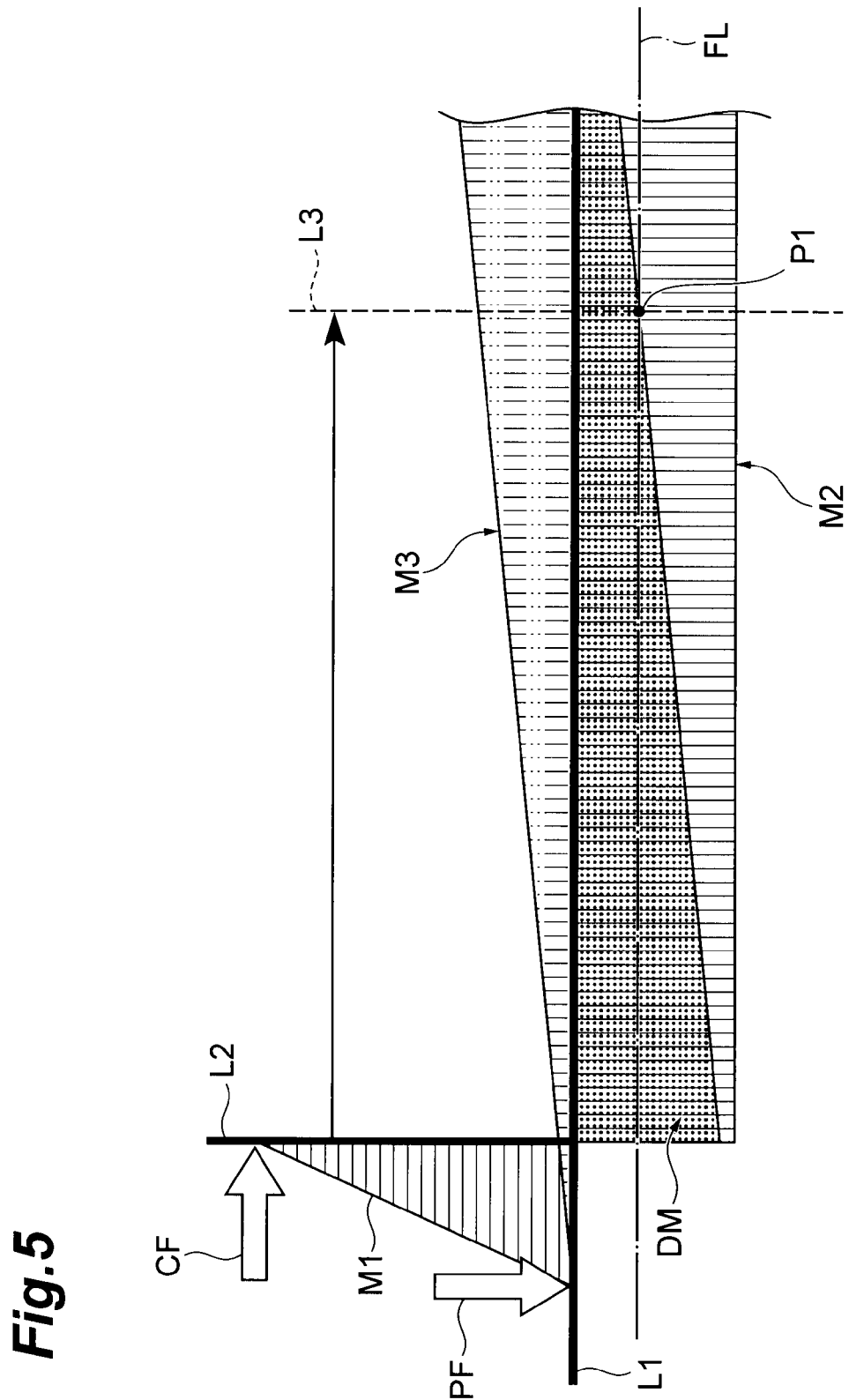

VEHICLE BODY STRUCTURE

TECHNICAL FIELD

The present invention relates to a vehicle body structure of a rear side of a vehicle.

BACKGROUND ART

As a vehicle body structure in the related art, there is known a structure where portions to be easily bent are provided between side members and crash boxes and a cross member is provided on the lower surface of the crash box (for example, Patent Document 1). In this vehicle body structure, the crash box is bent downward when the cross member comes into contact with a bumper of another vehicle having a different vehicle height. Front ends of the crash boxes and another vehicle buffer each other. Accordingly, a load is dispersed to the side members through the crash boxes.

CITATION LIST

Patent Literature

[Patent Document 1] Japanese Unexamined Patent Application Publication No. 2006-205943

SUMMARY OF INVENTION

Technical Problem

Here, since the crash boxes are bent in the above-mentioned vehicle body structure, it is possible to receive a load at the front ends of the crash boxes. However, the efficiency of transmission of a load to the side members might be reduced due to the downward bending of the crash boxes. Further, even when another vehicle having a vehicle height different from the vehicle height of a host vehicle collides with the host vehicle from behind, there has been demand for the suppression of the deformation of a trunk that is caused by the bumper of another vehicle. For this reason, there has been demand for the improvement of collision performance at the time of a rear collision.

The invention has been made to solve the problem, and an object of the invention is to provide a vehicle body structure that can improve collision performance at the time of a rear collision.

Solution to Problem

A vehicle body structure according to the invention includes a first impact absorbing unit that is provided at a rear end of a rear side member of a vehicle, and a second impact absorbing unit that is provided at a rear side of the vehicle. The second impact absorbing unit is disposed at a position different from a position of the first impact absorbing unit in a vertical direction of the vehicle.

When another vehicle having a vehicle height different from the vehicle height of a host vehicle collides with the host vehicle from behind, for example, a front bumper reinforcement BP of another vehicle may not come into contact with a rear bumper reinforcement of the host vehicle as shown in FIG. 2. However, according to the vehicle body structure of the invention, the second impact absorbing unit is disposed at the position different from the position of the first impact absorbing unit in the longitudinal direction of a vehicle. Accordingly, the second impact absorbing unit can absorb a load from the bumper reinforcement of another vehicle. Since the load at the time of a rear collision is received by the second impact absorbing units, it is possible to suppress the deformation of the trunk that is provided at the rear portion of a vehicle body. Accordingly, it is possible to improve collision performance at the time of a rear collision.

Further, in the vehicle body structure according to the invention, load transmitting member, which transmits a load applied to the second impact absorbing unit to the rear side member, may be connected to the rear side member; and the load transmitting member may be disposed in front of the second impact absorbing unit in a longitudinal direction of the vehicle and may be disposed so as to face the second impact absorbing unit in the longitudinal direction of the vehicle. Due to this structure, the load transmitting member receive a collision load from another vehicle through the second impact absorbing unit. The collision load is applied forward in the longitudinal direction of the vehicle. The collision load is transmitted to the rear side member by the load transmitting member. Accordingly, it is possible to suppress the deformation of vehicle body component toward the trunk. Furthermore, the load transmitting member faces the second impact absorbing unit, respectively. That is, like the second impact absorbing unit, the load transmitting member is disposed at the position different from the position of the first crash box in the vertical direction of the vehicle. That is, the load transmitting member is disposed at the position different from the position of the rear side member in the vertical direction of the vehicle. Accordingly, the collision load is applied to the load transmitting member, so that a moment is applied to the rear side member. Due to the moment, the rear side member is deformed toward the side where the load transmitting member is provided. Since the rear side member is deformed, the first impact absorbing unit, the rear side member, or the bumper reinforcement buffers the bumper reinforcement of another vehicle. Due to the buffering, a load in the vertical direction of the vehicle is applied to the rear side member. As described above, a part of the collision load applied forward in the longitudinal direction of the vehicle is converted into a load in the vertical direction of the vehicle. Accordingly, it is possible to further suppress the deformation of the trunk that is provided at the rear portion of a vehicle body.

Moreover, in the vehicle body structure according to the invention, the load transmitting member may be disposed in front of the first impact absorbing unit in the longitudinal direction of the vehicle. Accordingly, the rear side member is deformed, so that the first impact absorbing unit and the bumper reinforcement of another vehicle buffer each other. Therefore, it is possible to reliably generate a load in the vertical direction of the vehicle.

Further, in the vehicle body structure according to the invention, the load transmitting member may include a load receiving portion that receives a load from the second impact absorbing unit, and a transmitting portion that transmits the load received by the load receiving portion to the rear side member. The load transmitting member can receive a collision load at the position, where a moment is applied to the rear side member, by the load receiving portion. Moreover, the load transmitting member can transmit the collision load to the rear side member by the transmitting portion so that the rear side member can be deformed upward.

Further, in the vehicle body structure according to the invention, the load transmitting member may be provided in a trunk of the vehicle and be connected to the rear side member with a floor panel interposed between the rear side member and the load transmitting member. It is possible to suppress the deformation of the trunk, which is provided at the rear portion of a vehicle body, by a simple structure where the load transmitting member is provided in the trunk of the vehicle. Since this structure is simple, particularly, it is possible to improve the collision performance of a small vehicle.

Furthermore, in the vehicle body structure according to the invention, the load receiving portion may be formed by bending a plate material and the transmitting portion may be formed of a tubular member. For example, in order to sufficiently obtain a function of receiving a collision load and a function of transmitting a load by one member, the structure of the load transmitting member becomes complicated and enlarged. Accordingly, when the load transmitting member is applied to a small vehicle, there is a possibility that the size of the space of a trunk is reduced. However, since the load receiving portion is formed by bending a plate material in the vehicle body structure according to the invention, the load receiving portion has a simple structure and can reliably receive a collision load. Meanwhile, since the transmitting portion is formed of a tubular member, the transmitting portion has a simple structure and can reliably transmit a load to the rear side member. Accordingly, since the load transmitting member has a simple structure, it is possible to install the load transmitting members in a narrow space of a small vehicle.

Moreover, in the vehicle body structure according to the invention, the load receiving portion may include an opposite wall portion that faces the second impact absorbing unit, and a pair of side wall portions that extends forward from the opposite wall portion in the longitudinal direction of the vehicle; and the load receiving portion may be reinforced by a rod-like member that is connected to the pair of side wall portions. Accordingly, when the opposite wall portion receives a collision load, it is possible to suppress the out-of-plane deformation of the side wall portions. Therefore, it is possible to suppress the deterioration of load transmission performance of the load transmitting member.

Advantageous Effects of Invention

According to the invention, it is possible to improve collision performance at the time of a rear collision.

BRIEF DESCRIPTION OF DRAWINGS

FIG. 5 is a schematic view illustrating a moment applied to a rear side member.

DESCRIPTION OF EMBODIMENTS

A preferred embodiment of a vehicle body structure according to the invention will be described in detail below with reference to the drawings.

Figure 1:
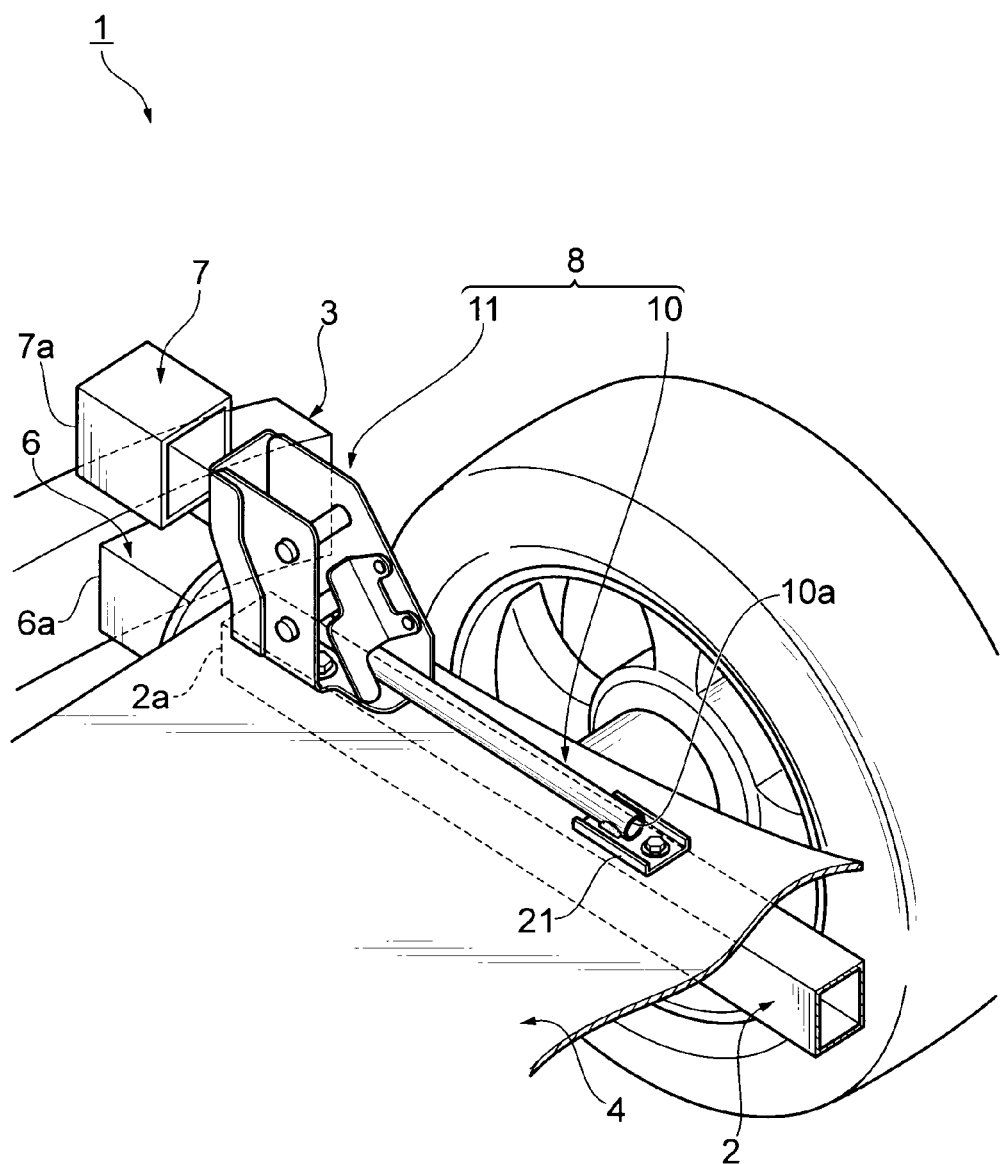
FIG. 1 is a perspective view of a vehicle body structure according to an embodiment of the invention.

FIG. 1 is a perspective view of a vehicle body structure 1 according to an embodiment of the invention. The vehicle body structure 1 is a framework structure and a reinforcing structure of a rear side of a vehicle. The vehicle body structure 1 has a function of absorbing a load when the load is applied from the rear side of a vehicle. In particular, the vehicle body structure 1 according to this embodiment has a function of effectively absorbing a load when receiving the load from behind from a vehicle having a vehicle height different from the vehicle height of a host vehicle. As shown in FIG. 1, the vehicle body structure 1 mainly includes rear side members 2, a bumper reinforcement 3, a floor panel 4, first crash boxes (first impact absorbing units) 6, second crash boxes (second impact absorbing units) 7, and load transmitting members 8.

The rear side members 2 are a pair of framework members that extends in the longitudinal direction of a vehicle. The rear side members 2 are disposed on both sides in a vehicle width direction, respectively. The rear side members 2 have a function of transmitting a load when receiving the load from behind due to the rear collision caused by another vehicle. Rear ends 2a of the rear side members 2 are connected to the bumper reinforcement 3 with the first crash boxes 6 interposed between the bumper reinforcement 3 and themselves. Front ends of the rear side members 2 are supported by a strong framework member, such as a rocker or a cross member (not shown).

The bumper reinforcement 3 is a framework member that extends in the vehicle width direction at the rear end portion of a vehicle. Both end portions of the bumper reinforcement 3 in the vehicle width direction are supported by the pair of rear side members 2, respectively. The bumper reinforcement 3 comes into contact with a bumper reinforcement, which is provided at the front end portion of another vehicle, at the time of a rear collision, so that the bumper reinforcement 3 receives a load. Further, the bumper reinforcement 3 transmits the received load to the rear side members 2.

The floor panel 4 is a plate-like member that covers a space between the pair of rear side members 2. Both edge portions of the floor panel 4 in the vehicle width direction are fixed to the upper surfaces of the rear side members 2. The floor panel 4 has a function of dividing a lower framework structure or the like of a vehicle from a cabin space or a trunk space of a vehicle. In this embodiment, the area above the floor panel 4 is the trunk space.

The first crash boxes 6 are impact absorbing members that are provided between the rear ends 2a of the rear side members 2 and the bumper reinforcement 3. The first crash boxes 6 have a function of absorbing an impact by being crushed when the bumper reinforcement 3 receives a load from another vehicle.

The second crash boxes 7 are impact absorbing members that are disposed at positions different from the positions of the first crash boxes 6 in the vertical direction of a vehicle. The second crash boxes are disposed above the first crash boxes 6. The second crash boxes 7 have a function of absorbing an impact when another vehicle, which has a vehicle height higher than the vehicle height of the host vehicle, collides with the host vehicle from behind. That is, when a front bumper reinforcement BP of another vehicle having a high vehicle height is at a position above the rear bumper reinforcement 3 of the host vehicle, the bumper reinforcement BP of another vehicle does not come into contact with the rear surface of the bumper reinforcement 3 of the host vehicle. However, the second crash boxes 7 come into contact with the bumper reinforcement BP of another vehicle and can absorb a load (see FIG. 4). As long as the second crash boxes 7 are disposed above the first crash boxes 6, the positions of the second crash boxes 7 are not particularly limited. The second crash boxes 7 are fixed to a panel 9 such as a lower back (see FIG. 4). Meanwhile, the panel 9 is not shown in FIG. 1. Front ends 7a of the second crash boxes 7 further protrude toward the rear side of a vehicle as compared to the front ends 6a of the first crash boxes 6.

The load transmitting members 8 are provided on the upper surfaces of the rear side members 2 close to the rear ends 2a with the floor panel 4 interposed between the upper surfaces of the rear side members 2 and themselves. The load transmitting members 8 are disposed in front of the second crash boxes 7 in the longitudinal direction of the vehicle. Further, the load transmitting members 8 face the second crash boxes 7. The load transmitting members 8 have a function of transmitting loads, which are applied to the second crash boxes 7, to the rear side members 2. The load transmitting members 8 are provided in the trunk of a vehicle. Further, the load transmitting members 8 are disposed in front of the first crash boxes 6 in the longitudinal direction of a vehicle. Each of the load transmitting members 8 includes a load receiving portion 11 and a transmitting portion 10. The load receiving portion 11 has a function of receiving a load from the crash box 7. The transmitting portion 10 has a function of transmitting a load, which is received by the load receiving portion 11, to the rear side member 2.

Figure 2:
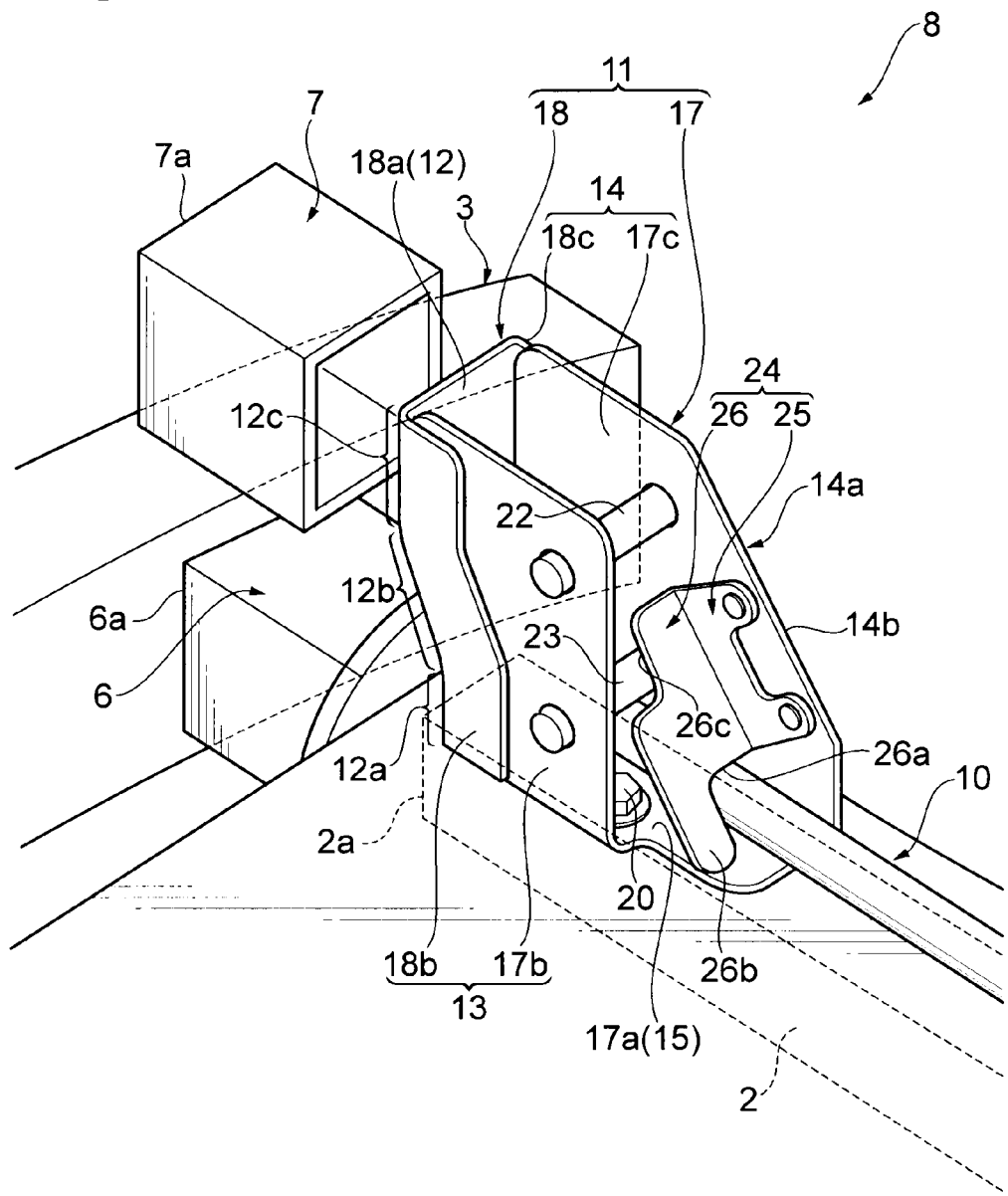
FIG. 2 is an enlarged perspective view of a load transmitting member of the vehicle body structure according to the embodiment of the invention.
Figure 3:
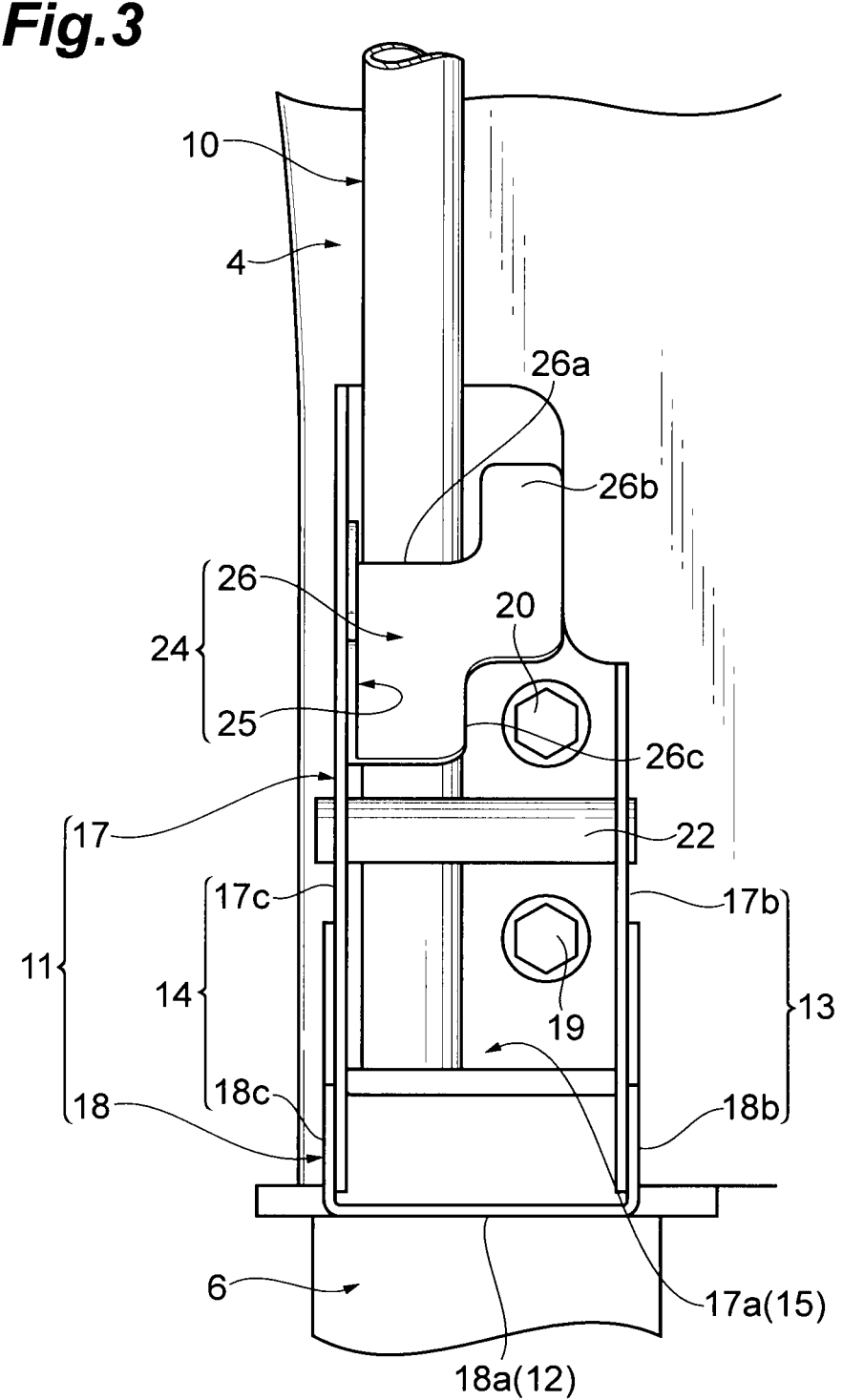
FIG. 3 is a view of the load transmitting member of the vehicle body structure according to the embodiment of the invention as seen from above.

FIG. 2 is an enlarged perspective view of the load transmitting member 8. FIG. 3 is a view of the load transmitting member 8 as seen from above. As shown in FIGS. 2 and 3, the load receiving portion 11 is formed by bending a plate material. The load receiving portion 11 includes an opposite wall portion 12, a side wall portion 13, a side wall portion 14, and a bottom wall portion 15. The load receiving portion 11 is hollow, and the load receiving portion 11 is opened to the upper side and the front side. The opposite wall portion 12 forms the rear wall of the load receiving portion 11 and faces the second crash box 7. The side wall portion 13 extends from an inner edge portion of the opposite wall portion 12 in the vehicle width direction to the front side of a vehicle. The side wall portion 14 extends from an outer edge portion of the opposite wall portion 12 in the vehicle width direction to the front side of a vehicle. The bottom wall portion 15 connects the lower ends of the opposite wall portion 12 and the side wall portions 13 and 14. The bottom wall portion 15 comes into contact with the upper surface of the floor panel 4, and is connected to the rear side member 2 with the floor panel 4 interposed between the rear side member 2 and itself.

The opposite wall portion 12 of the load receiving portion 11 includes a lower portion 12a, an inclined portion 12b, and an upper portion 12c. The lower portion 12a extends upward from an upper surface portion near the rear end 2a of the rear side member 2. The inclined portion 12b extends upward from the upper end of the lower portion 12a so as to be inclined obliquely toward the rear side of a vehicle. The upper portion 12c extends upward from the upper end of the inclined portion 12b. Accordingly, the opposite wall portion 12 is formed so that the upper portion 12c is close to the rear side of a vehicle as compared to the lower portion 12a. The upper portion 12c of the opposite wall portion 12 mainly faces the second crash box 7. Accordingly, the load receiving portion 11 is formed so that a position where the load receiving portion receives a load from another vehicle is close to the rear side of a vehicle as compared to a position where a load is transmitted to the rear side member 2. At the time of a rear collision, a load applied from the second crash box 7 is received by an upper portion 12c that is close to the rear side of a vehicle as compared to the lower portion 12a. Accordingly, the load receiving portion 11 can early transmit a load to the rear side member 2 at the time of a rear collision.

The side wall portion 13 of the load receiving portion 11 is formed in a substantially rectangular shape. The rear edge portion of the side wall portion 13 in the longitudinal direction of a vehicle is formed in a stepped shape so as to correspond to the stepped shape of the opposite wall portion 12. The side wall portion 14 of the load receiving portion 11 has a shape where an expanded portion 14a expanded toward the front side of a vehicle is added to the shape of the side wall portion 13. That is, as seen in the vehicle width direction, the side wall portion 14 includes a portion that overlaps the side wall portion 13 and a portion that does not overlap the side wall portion 13 and the portion that does not overlap the side wall portion 13 is the expanded portion 14a (see FIG. 4). A part of a front edge portion 14b of the expanded portion 14a in the longitudinal direction of a vehicle is inclined from the upper side to the lower side toward the front side of a vehicle. The width of the bottom wall portion 15 in the longitudinal direction of a vehicle corresponds to the width of the lower end of the side wall portion 14 in the longitudinal direction of a vehicle. The bottom wall portion 15 is connected to the rear side member 2 by bolts 19 and 20 that are lined up in the longitudinal direction of a vehicle.

The load receiving portion 11 includes a first bent plate material 17 that is formed by bending a plate material and a second bent plate material 18 that is formed by bending a plate material. The first bent plate material 17 is formed by bending both end portions of one plate material at a right angle. The first bent plate material 17 includes a base portion 17a that forms the bottom wall portion 15, a bent portion 17b that forms the side wall portion 13, and a bent portion 17c that forms the side wall portion 14. The second bent plate material 18 includes a base portion 18a that forms the opposite wall portion 12, a bent portion 18b that forms the side wall portion 13, and a bent portion 18c that forms the side wall portion 14. That is, the bent portion 18b of the second bent plate material 18 is connected to the rear edge portion of the bent portion 17b of the first bent plate material 17 in the longitudinal direction of a vehicle by welding or screwing, and the bent portion 18c of the second bent plate material 18 is connected to the rear edge portion of the bent portion 17c of the first bent plate material 17 in the longitudinal direction of a vehicle by welding or screwing. Accordingly, the side wall portion 13 of the load receiving portion 11 is formed of bent portions 17b and 18b, and the side wall portion 14 is formed of the bent portions 17c and 18c.

The transmitting portion 10 is formed of a pipe (tubular member). The transmitting portion 10 extends in the longitudinal direction of a vehicle along the upper surface of the rear side member 2. The rear end portion of the transmitting portion 10 in the longitudinal direction of a vehicle is fixed to the lower portion 12a of the opposite wall portion 12 by welding or the like. A front end portion 10a of the transmitting portion 10 in the longitudinal direction of a vehicle is fixed to a plate 21 by welding or the like. The plate 21 is connected to the upper surface of the rear side member 2 with the floor panel 4 interposed between the upper surface of the rear side member 2 and itself, and is fixed to the rear side member 2 by screwing. The transmitting portion 10 also has a function of reinforcing the rear side member 2 against a moment generated when a load is applied to the load transmitting member 8. The transmitting portion 10 is provided at a portion of the rear side member 2 that needs to be reinforced against the moment. The detailed description of which position the end portion 10a of the transmitting portion 10 extends to will be provided together with the description of the operation and effect of the vehicle body structure 1 according to this embodiment to be described below.

The load transmitting member 8 further includes a reinforcing member that suppresses the deterioration of load transmission performance. Specifically, the load transmitting member 8 includes rod-like members 22 and 23 and a bent plate material 24. The rod-like members 22 and 23 are connected to the side wall portions 13 and 14 of the load receiving portion 11. The rod-like members 22 and 23 have a function of preventing the out-of-plane buckling of the side wall portions 13 and 14 when a load is applied. Accordingly, the rod-like members 22 and 23 can suppress the deterioration of the load transmission performance of the load transmitting member 8. The rod-like members 22 and 23 are disposed between the bolts 19 and 20 in the longitudinal direction of a vehicle. The rod-like member 22 is disposed above the rod-like member 23. Since the rod-like members are disposed as described above, the rod-like member 23 does not overlap the bolts 19 and 20 as seen from above (particularly see FIG. 3). Therefore, it is easy to perform an operation for tightening the bolts 19 and 20 when fixing the load receiving portion 11 to the rear side member 2.

The cross-section of the bent plate material 24 is bent in an L shape, and is mounted on the expanded portion 14a of the side wall portion 14. The bent plate material 24 includes a connecting portion 25 and a support portion 26. The connecting portion 25 is connected to the inner surface of the expanded portion 14a of the side wall portion 14. The support portion 26 can support the load receiving portion 11 by coming into contact with the transmitting portion 10 at a lower end 26a thereof when a load is applied. The bent plate material 24 is inclined along the inclined edge portion 14b of the expanded portion 14a. That is, the bent plate material 24 extends so as to be inclined from the upper side to the lower side toward the front side of a vehicle.

A cut out portion 26c is formed at a part of the upper end portion of the support portion 26 of the bent plate material 24 corresponding to the inside of a vehicle. The cut out portion 26c is formed so that the bolt 20 is exposed to the outside as seen from above (particularly see FIG. 3). Accordingly, it is easy to perform an operation for tightening the bolt 20 when fixing the load receiving portion 11 to the rear side member 2. An extended portion 26b is formed so as to extend downward from a part of the lower end of the support portion 26 of the bent plate material 24. The transmitting portion 10 is formed so as to be surrounded by the lower end 26a, the extended portion 26b, and the side wall portion 14. Accordingly, when a load is applied, the bent plate material 24 can reliably come into contact with the transmitting portion 10 without deviating. Further, since the bent plate material 24 comes into contact with the transmitting portion 10, the bent plate material 24 can suppress deformation by supporting the load receiving portion 11 and suppress the deterioration of load transmission performance.

Figure 4:
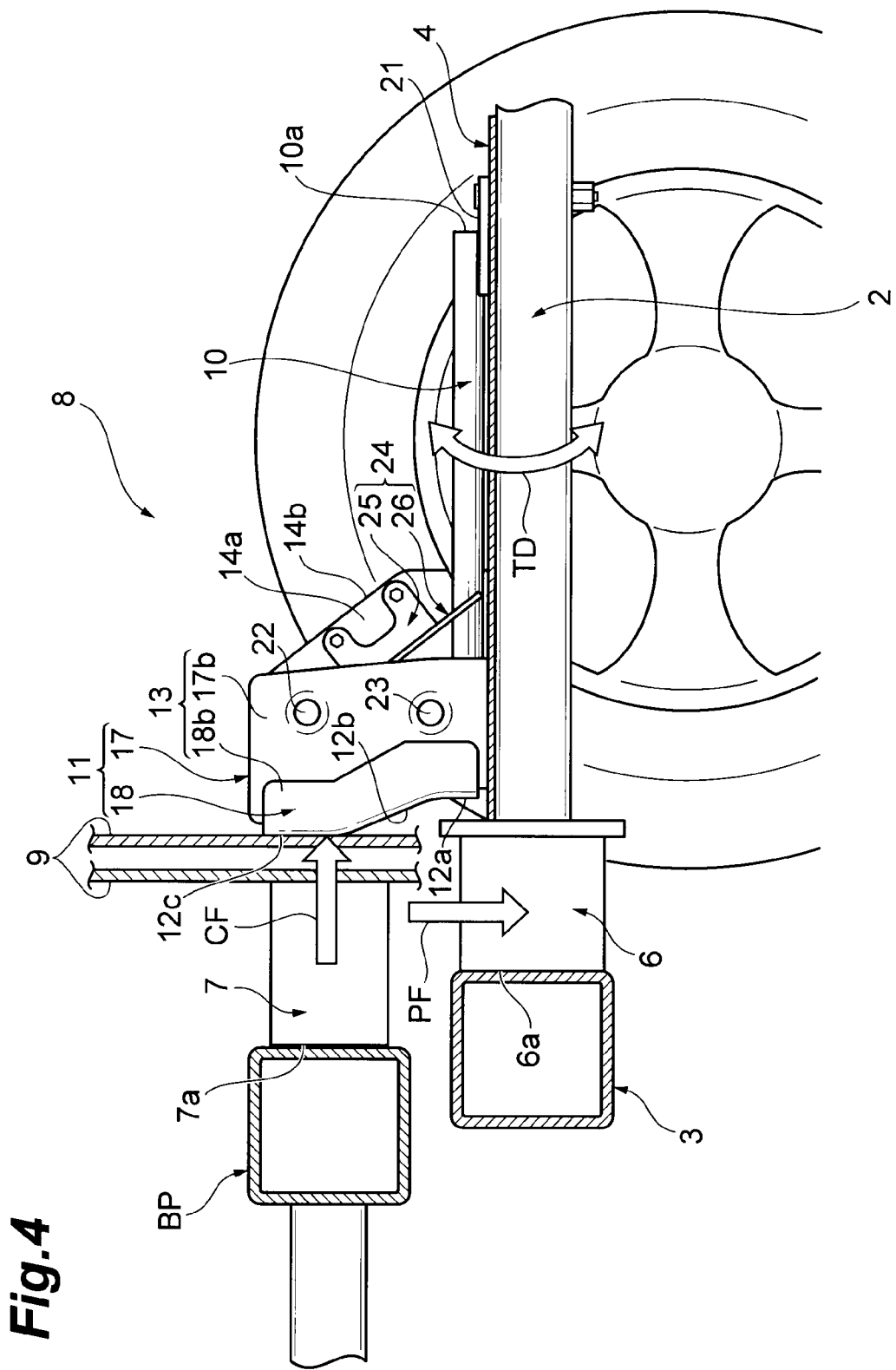
FIG. 4 is a side view of the vehicle body structure according to the embodiment of the invention immediately before another vehicle collides with the vehicle body structure from behind.

Next, the operation and effect of the vehicle body structure 1 according to this embodiment will be described with reference to FIGS. 4 and 5. FIG. 4 is a side view of the vehicle body structure 1 according to the embodiment of the invention immediately before another vehicle collides with the vehicle body structure from behind. FIG. 5 is a schematic view illustrating a moment applied to the rear side member 2.

The vehicle body structure 1 according to this embodiment includes the first and second crash boxes 6 and 7 that are provided at the rear ends 2a of the rear side members 2. Further, the second crash boxes 7 are disposed at the positions different from the positions of the first crash boxes 6 in the vertical direction of a vehicle. When another vehicle having a vehicle height different from the vehicle height of a host vehicle collides with the host vehicle from behind, the front bumper reinforcement BP of another vehicle may not come into contact with the rear bumper reinforcement 3 of the host vehicle as shown in FIG. 2. However, the second crash boxes 7, which are disposed at the positions different from the positions of the first crash boxes 6, can absorb a load applied from the bumper reinforcement BP of another vehicle. Since the load at the time of a rear collision can be absorbed by the second crash boxes 7, it is possible to suppress the deformation of the trunk that is provided at the rear portion of a vehicle body. Accordingly, it is possible to improve collision performance at the time of a rear collision from the above description.

Further, the vehicle body structure 1 according to this embodiment includes the load transmitting members 8 that transmit the load applied to the second crash boxes 7 to the rear side members 2. Each of the load transmitting members 8 is disposed in front of the second crash box 7 in the longitudinal direction of a vehicle, and is disposed so as to face the second crash box 7. Due to this structure, the load receiving portion 11 of each of the load transmitting members 8 receives a collision load CF from another vehicle through the second crash box 7 as shown in FIG. 2. The collision load CF is applied forward in the longitudinal direction of a vehicle. The collision load CF is transmitted to the rear side member 2 by the load transmitting member 8. Accordingly, it is possible to suppress the deformation of vehicle body components toward the trunk. Furthermore, the load transmitting members 8 face the second crash boxes 7. That is, like the second crash boxes 7, the load transmitting members 8 are disposed at the positions different from the positions of the first crash boxes 6 in the vertical direction of a vehicle. That is, the load transmitting members 8 are disposed at the positions different from the positions of the rear side members 2 in the vertical direction of a vehicle. Accordingly, the collision load CF is applied to the load transmitting members 8, so that a moment is applied to the rear side members 2. Due to the moment, the rear side members 2 are deformed as shown by TD in the drawing toward the upper side where the load transmitting members 8 are provided. Since the rear side members 2 are deformed upward, the upper surfaces of the first crash boxes 6, the upper surfaces of the rear end portions of the rear side members 2, or the upper surfaces of the bumper reinforcement 3 buffers the bumper reinforcement BP of another vehicle. Due to the buffering, a vertical load PF is applied to the rear side members 2. The vertical load PF is applied downward. As described above, a part of the collision load CF applied forward in the longitudinal direction of a vehicle is converted into the vertical load PF. Accordingly, it is possible to further suppress the deformation of the trunk that is provided at the rear portion of a vehicle body.

Further, in the vehicle body structure 1 according to this embodiment, the load transmitting members 8 are disposed in front of the first crash boxes 6 in the longitudinal direction of a vehicle. Accordingly, the rear side members 2 are deformed upward, so that the first crash boxes 6 and the bumper reinforcement BP of another vehicle buffer each other. Therefore, it is possible to reliably generate a vertical load PF that is applied downward.

Furthermore, in the vehicle body structure 1 according to this embodiment, each of the load transmitting members 8 includes the load receiving portion 11 that receives a collision load CF and the transmitting portion 10 that transmits the load received by the load receiving portion 11 to the rear side member 2. The load transmitting member 8 can receive a collision load CF at the position, where a moment is applied to the rear side member 2, by the load receiving portion 11. Moreover, the load transmitting member 8 can transmit the collision load CF to the rear side member 2 by the transmitting portion 10 so that the rear side member 2 can be deformed upward.

Further, in the vehicle body structure 1 according to this embodiment, the load transmitting members 8 are provided in the trunk of a vehicle and each of the load transmitting members 8 is connected to the rear side member 2 with the floor panel 4 interposed between the rear side member 2 and itself. It is possible to suppress the deformation of the trunk, which is provided at the rear portion of a vehicle body, by a simple structure where the load transmitting members 8 are provided in the trunk of a vehicle. Since this structure is simple, particularly, it is possible to improve the collision performance of a small vehicle.

Furthermore, in the vehicle body structure 1 according to this embodiment, the load receiving portion 11 is formed by bending a plate material and the transmitting portion 10 is formed of a tubular member such as a pipe. For example, in order to sufficiently obtain a function of receiving a collision load CF and a function of transmitting a load by one member, the structure of the load transmitting member becomes complicated and enlarged. Accordingly, when the load transmitting members are applied to a small vehicle, there is a possibility that the size of the space of a trunk is reduced. However, since the load receiving portion 11 is formed by bending a plate material in this embodiment, the load receiving portion 11 has a simple structure and can reliably receive a collision load. Meanwhile, since the transmitting portion 10 is formed of a tubular member, the transmitting portion 10 has a simple structure and can reliably transmit a load to the rear side member 2. Accordingly, since the load transmitting member 8 has a simple structure, it is possible to install the load transmitting members 8 in a narrow space of a small vehicle.

Moreover, in the vehicle body structure 1 according to this embodiment, the load receiving portion 11 is reinforced by the rod-like members 22 and 23 that are connected to the side wall portions 13 and 14. Accordingly, when the opposite wall portion 12 receives a collision load CF, it is possible to suppress the out-of-plane deformation of the side wall portions 13 and 14. Therefore, it is possible to suppress the deterioration of load transmission performance of the load transmitting member 8.

Next, a moment applied to the rear side member 2 will be described with reference to FIG. 5. Further, a method of determining which position the front end portion 10a of the transmitting portion 10 extends to will be described. FIG. 5 is a schematic view illustrating a moment applied to the rear side member 2. The upper side in FIG. 5 represents the front side of a vehicle and the lower side in FIG. 5 represents the rear side of a vehicle. For description, in FIG. 5, the rear side member 2, the first crash box 6, and the bumper reinforcement 3 are represented by one solid line L1 extending in the longitudinal direction of a vehicle. Further, the opposite wall portion 12 of the load transmitting member 8 is represented at a position, where a collision load CF is received from another vehicle, by one solid line L2 extending in a vertical direction. FIG. 5 shows a moment generated at the rear side member 2 or the like when a collision load CF is applied to a schematic model and a vertical load PF is applied to the schematic model as the rear side member 2 is deformed due to the application of the collision load CF. Meanwhile, when the vertical load PF is applied, the rear side member 2 is deformed upward. However, in FIG. 5, for easy understanding, it is described that a vertical load PF is applied to the rear side member 2 while the rear side member 2 is maintained horizontal. Furthermore, the rear side member 2 is modeled as a cantilever beam that is fixed and supported at a position where the rear side member is fixed to a side member or a rocker (not shown) at the front portion of a vehicle.

Moment diagrams M1 and M2 shown in FIG. 5 show moments generated by the application of a collision load CF to the load transmitting member 8, that is, the solid line L2. Meanwhile, each of the moments of the moment diagrams M1 and M2 is shown by a solid line. A moment diagram M3 shows moments generated by the application of a vertical load PF to the bumper reinforcement 3 or the first crash box 6, that is, a solid line L1. Meanwhile, each of the moments of the moment diagram M3 is shown by a two-dot chain line.

The collision load CF is applied in the same direction as a direction where the rear side member 2 extends. Accordingly, as shown in the moment diagram M2, a moment applied to the rear side member 2 by the collision load CF is constant. The vertical load PF is applied substantially perpendicular to the direction where the rear side member 2 extends. Accordingly, as shown in the moment diagram M3, a moment applied to the rear side member 2 by the vertical load PF is increased forward in the longitudinal direction of a vehicle. Further, the moment generated by the vertical load PF is generated in a direction opposite to the moment generated by the collision load CF. Accordingly, the moments are cancelled each other. The moment applied to the rear side member 2 is a moment that is obtained by subtracting the moment (shown in the moment diagram M3) generated by the vertical load PF from the moment (shown in the moment diagram M2) generated by the collision load CF. The subtracted moment is shown in FIG. 5 by a dotted area DM. Meanwhile, actually, the moment generated by the collision load CF is much larger than the moment generated by the vertical load PF. For description, the moment generated by the collision load CF is shown to be small in FIG. 5.

In FIG. 5, a dashed-dotted line FL denotes the resistance of the rear side member 2 to the moment. As shown in FIG. 5, the moment, which is obtained by subtracting the moment generated by the vertical load PF from the moment generated by the collision load CF, is larger than the resistance of the rear side member 2 in the rear area of P1 in the longitudinal direction of a vehicle and is smaller than the resistance of the rear side member 2 in the front area of P1 in the longitudinal direction of a vehicle. Accordingly, it is preferable that the transmitting portion 10 extend to the position of a vertical line L3 crossing P1. Therefore, the transmitting portion 10 can reinforce the rear area of P1 in the longitudinal direction of a vehicle. The transmitting portion 10 can prevent the rear side member 2 from being deformed to an unexpected position close to the rear end when the collision load CF is applied. Meanwhile, it is preferable that the transmitting portion 10 extend to the front side of the position of the vertical line L3 in the longitudinal direction of a vehicle.

The invention is not limited to the above-mentioned embodiment. For example, the second crash box 7 and the load transmitting member 8 may be provided on the lower surface of the rear side member 2. Accordingly, if the vehicle height of a host vehicle is high, it is possible to improve collision performance when another vehicle having a low vehicle height collides with the host vehicle from behind.

Further, in the above-mentioned embodiment, for a simple structure, the load receiving portion 11 of the load transmitting member 8 has been formed of a plate-like member and the transmitting portion 10 of the load transmitting member 8 has been formed of a pipe. However, the load transmitting member 8 may be formed of one bulk head or the like that has a function of receiving a load and a function of transmitting a load.

Furthermore, the load receiving portion 11 has included the first and second bent plate materials 17 and 18, but may be formed of one bent plate material. Moreover, reinforcing members, such as rod-like members 22 and 23 and the bent plate material 24, may not be provided.

Industrial Applicability

The invention may be used to absorb a load that is applied to a vehicle.

REFERENCE SIGNS LIST

1: vehicle body structure
2: rear side member
4: floor panel
6: first crash box (first impact absorbing unit)
7: second crash box (second impact absorbing unit)
8: impact absorbing member
10: transmitting portion
11: impact receiving portion
12: opposite wall portion
13, 14: side wall portion

The invention claimed is:

1. A vehicle body structure comprising:
a first impact absorbing unit that is provided at a rear end of a rear side member of a vehicle; and
a second impact absorbing unit that is provided at a rear side of the vehicle, the second impact absorbing unit includes a side face that faces a front side of the vehicle,
wherein the second impact absorbing unit is disposed at a position different from a position of the first impact absorbing unit and is spaced apart from the first impact absorbing unit in a vertical direction of the vehicle,
a load transmitting member, which transmits a load applied to the second impact absorbing unit to the rear side member, is connected to the rear side member,
the load transmitting member is disposed in front of the entire side face of the second and first impact absorbing units in a longitudinal direction of the vehicle in a direction of the front side of the vehicle as viewed from the vehicle width direction, and is disposed so as to face the second impact absorbing unit in the longitudinal direction of the vehicle at a position overlapping the rear side member as viewed from the vertical direction of the vehicle,
the load transmitting member is provided in a trunk of the vehicle and is connected to the rear side member with a floor panel interposed between the rear side member and the load transmitting member,
the second impact absorbing unit is a crash box, and
the load transmitting member receives a load applied from the second impact absorbing unit since the load transmitting member faces the crash box, which is the second impact absorbing unit.

2. The vehicle body structure according to claim 1,
wherein the load transmitting member includes a load receiving portion that receives a load from the second impact absorbing unit, and a transmitting portion that transmits the load received by the load receiving portion to the rear side member.

3. The vehicle body structure according to claim 2,
wherein the load receiving portion is formed by bending a plate material, and
the transmitting portion is formed of a tubular member that extends along an upper surface of the rear side member in the longitudinal direction of the vehicle.

4. The vehicle body structure according to claim 3,
wherein the load receiving portion includes an opposite wall portion that faces the second impact absorbing unit, and a pair of side wall portions that extends forward from the opposite wall portion in the longitudinal direction of the vehicle, and
the load receiving portion is reinforced by a rod-like member that is connected to the pair of side wall portions.

5. A vehicle body structure comprising:
a first impact absorbing unit that is provided at a rear end of a rear side member of a vehicle; and
a second impact absorbing unit that is provided at a rear side of the vehicle, the second impact absorbing unit includes a side face that faces a front side of the vehicle,
wherein the second impact absorbing unit is disposed at a position different from a position of the first impact absorbing unit and is spaced apart from the first impact absorbing unit in a vertical direction of the vehicle,
a load transmitting member, which transmits a load applied to the second impact absorbing unit to the rear side member, is connected to the rear side member,
the load transmitting member is disposed in front of the entire side face of the second and first impact absorbing units in a longitudinal direction of the vehicle in a direction of the front side of the vehicle as viewed from the vehicle width direction, and is disposed so as to face the second impact absorbing unit in the longitudinal direction of the vehicle at a position overlapping the rear side member as viewed from the vertical direction of the vehicle,
the second impact absorbing unit is a crash box,
the load transmitting member receives a load applied from the second impact absorbing unit since the load transmitting member faces the crash box, which is the second impact absorbing unit,
the load transmitting members include load receiving portions that receive loads from the second impact absorbing units, and transmitting portions that transmit the loads received by the load receiving portions to the rear side members,
the load receiving portion is formed by bending a plate material,
the transmitting portion is formed of a tubular member that extends along an upper surface of the rear side member in the longitudinal direction of the vehicle,
the load receiving portion includes an opposite wall portion that faces the second impact absorbing unit, and a pair of side wall portions that extends forward from the opposite wall portion in the longitudinal direction of the vehicle, and
the load receiving portion is reinforced by a rod-like member that is connected to the pair of side wall portions.

6. A vehicle body structure comprising:
a first impact absorbing unit that is provided at a rear end of a rear side member of a vehicle; and
a second impact absorbing unit that is provided at a rear side of the vehicle, the second impact absorbing unit includes a side face that faces a front side of the vehicle,
wherein the second impact absorbing unit is disposed at a position different from a position of the first impact absorbing unit and is spaced apart from the first impact absorbing unit in a vertical direction of the vehicle,
the second impact absorbing unit is disposed at a position different from a position of the rear side member in the vertical direction of the vehicle,
a load transmitting member, which transmits a load applied to the second impact absorbing unit to the rear side member, is connected to the rear side member, the load transmitting member is disposed in front of the entire side face of the second impact absorbing unit and the first impact absorbing unit in a longitudinal direction of the vehicle in a direction of the front side of the vehicle as viewed from the vehicle width direction, and is disposed so as to face the second impact absorbing unit in the longitudinal direction of the vehicle at a position overlapping the rear side member as viewed from the vertical direction of the vehicle, the second impact absorbing unit is a crash box, and the load transmitting member receives a load applied from the second impact absorbing unit since the load transmitting member faces the crash box, which is the second impact absorbing unit.

7. The vehicle body structure according to claim 6, wherein the load transmitting member includes a load receiving portion that receives a load from the second impact absorbing unit, and a transmitting portion that transmits the load received by the load receiving portion to the rear side member.

8. The vehicle body structure according to claim 6, wherein the load transmitting member is provided in a trunk of the vehicle and is connected to the rear side member with a floor panel interposed between the rear side member and the load transmitting member.

9. The vehicle body structure according to claim 7, wherein the load receiving portion is formed by bending a plate material, and the transmitting portion is formed of a tubular member that extends along an upper surface of the rear side member in the longitudinal direction of the vehicle.

10. The vehicle body structure according to claim 9, wherein the load receiving portion includes an opposite wall portion that faces the second impact absorbing unit, and a pair of side wall portions that extends forward from the opposite wall portion in the longitudinal direction of the vehicle, and the load receiving portion is reinforced by a rod-like member that is connected to the pair of side wall portions.

11. A vehicle body structure comprising:

a first impact absorbing unit that is provided at a rear end of a rear side member of a vehicle; and a second impact absorbing unit that is provided at a rear side of the vehicle, the second impact absorbing unit includes a side face that faces a front side of the vehicle, wherein the second impact absorbing unit is disposed at a position different from a position of the first impact absorbing unit and is spaced apart from the first impact absorbing unit in a vertical direction of the vehicle, a load transmitting member, which transmits a load applied to the second impact absorbing unit to the rear side member, is connected to the rear side members, the load transmitting member is disposed in front of the entire side face of the second and first impact absorbing units in a longitudinal direction of the vehicle in a direction of the front side of the vehicle as viewed from the vehicle width direction, and is disposed so as to face the second impact absorbing unit in the longitudinal direction of the vehicle at a position overlapping the rear side member as viewed from the vertical direction of the vehicle, the second impact absorbing unit is a crash box, the load transmitting member receives a load applied from the second impact absorbing unit since the load transmitting member faces the crash box, which is the second impact absorbing unit, the load transmitting member includes a load receiving portion that receives a load from the second impact absorbing unit, and the load receiving portion includes an opposite wall portion that faces the second impact absorbing unit, and side wall portions that extend forward from the opposite wall portion in the longitudinal direction of the vehicle.

12. The vehicle body structure according to claim 11, wherein the load transmitting member includes a load receiving portion that receive a load from the second impact absorbing unit, and a transmitting portion that transmits the load received by the load receiving portion to the rear side member.

13. The vehicle body structure according to claim 11, wherein the load transmitting member is provided in a trunk of the vehicle and is connected to the rear side member with a floor panel interposed between the rear side member and the load transmitting member.

14. The vehicle body structure according to claim 12, wherein the load receiving portion is formed by bending a plate material, and the transmitting portion is formed of a tubular member that extends along an upper surface of the rear side member in the longitudinal direction of the vehicle.

15. The vehicle body structure according to claim 14, wherein the load receiving portion includes an opposite wall portion that faces the second impact absorbing unit, and a pair of side wall portions that extends forward from the opposite wall portion in the longitudinal direction of the vehicle, and the load receiving portion is reinforced by a rod-like member that is connected to the pair of side wall portions.

* * * * *